United States Patent [19]

Hess

[11] 4,004,742

[45] Jan. 25, 1977

[54] ROTARY MEAT GRINDER WITH BONE-COLLECTING FACILITIES

[75] Inventor: Charles W. Hess, Schiller Park, Ill.

[73] Assignee: Speco, Inc., Schiller Park, Ill.

[22] Filed: Feb. 17, 1976

[21] Appl. No.: 658,365

[52] U.S. Cl. .............................................. 241/82.5

[51] Int. Cl.$^2$ .......................................... A47J 43/07

[58] Field of Search ............... 241/82.1, 82.2, 82.3, 241/82.4, 82.5, 82.6, 82.7

[56] References Cited

UNITED STATES PATENTS

| | | | |
|---|---|---|---|
| 3,529,646 | 9/1970 | Pavia | 241/82.5 |
| 3,934,827 | 1/1976 | Seydelmann | 241/82.3 |

*Primary Examiner*—Granville Y. Custer, Jr.

*Attorney, Agent, or Firm*—Norman H. Gerlach

[57] ABSTRACT

A meat grinder comprising a horizontally extending hopper-equipped casing, a stationary vertically extending perforated grinder plate at the discharge or outlet end of the casing, a rotary slicing knife in opposed and cooperative relation with the plate, and a rotary meat-impelling worm which feeds the meat product to be ground through the casing from the hopper to the plate and knife, and characterized by the fact that the grinder plate is provided in its forward or inner face with an involute spiral channel or groove into which bone fragments are swept under the influence of the rotating knife to the end that the thus captured bone fragments are caused to shift radially inwards toward the central portion of the plate where, they are collected in a more or less closed chamber-like bone-receiving pocket in the form of a counterbore which is formed in and coaxial with the plate. In a modified form of the invention, the bone-capturing channel or groove in the forward face of the stationary perforated grinder plate is linearly straight and communicates with the counterbore in a generally tangential fashion.

3 Claims, 4 Drawing Figures

ROTARY MEAT GRINDER WITH BONE-COLLECTING FACILITIES

The present invention relates generally to rotary meat grinders and has particular reference to that type of grinder which is used primarily in commercial establishments for the large-scale production of hamburger the meat for which is usually supplied in large quantities to restaurants such as drive-in eating establishments where hamburgers afford the principal attraction and food item.

In the commercial preparation of hamburger meat, it is invariably the practice for meat carvers or butchers to work on the original animal carcass by first slicing large pieces of meat from the carcass bones and then sub-dividing such pieces into comparatively small chunks of a size suitable for feeding into the usual funnel-shaped hopper of the casing of a rotary power-driven meat grinder. Due to the sharpness of the carving knives which are used as well as the rapidity with which the carvers or butchers ordinarily work, bone fragments, both small and large, are frequently passed along with the meat chunks and enter the grinder casing therewith. The relatively small bone fragments readily pass through the perforations in the stationary grinder plate of the grinder under the pressure of the oncoming chunks of meat, while the larger bone fragments which due to their size cannot pass immediately through the perforations in the grinder plate are swept around the forward face of the plate until the blades of the rotary slicing knife progressively chip, abrade, slice, or otherwise reduce them to such small size that the entire content thereof passes through the perforations in the form of small bone particles. In other words, such bone fragments as are fed into the meat grinder, regardless of their size, ultimately find their way into the meat product which is, after cooking, served to the customer.

The present invention is designed to overcome the above-noted limitation that is attendant upon the construction and use of a conventional meat grinder and, toward this end, the preferred form of the invention contemplates the provision in a rotary meat grinder of a novel perforated grinder plate in which the forward face thereof, i.e., the face which cooperates with the radially extending blades of the rotary slicing knife, is formed with a shallow channel or groove which has an imperforate bottom wall, is of involute spiral form, extends from the peripheral region of the grinder plate radially inwards, and has its inner end in communication with an annular pocket in the form of a counterbore which is coaxial with the plate and constitutes, in effect, a bone-collection chamber. The effectiveness of such a spiral groove for bone-collecting and removal purposes is predicated upon the fact that as the generally radially extending blades of the rotary slicing knife sweep around the forward face of the perforated grinder plate in the usual manner, a few small particles of bone may be forced through the perforations in the grinder plate but a large percentage of the bone particles will be swept circumferentially into intersecting relationship with the involute spiral groove so that they will collect therein, and then, as the groove tends to become filled, the camming action of the knife blades will urge the entire mass of bone fragments or particles within the groove generally radially inwardly and cause it to become deposited in the aforementioned centrally located pocket. More importantly, large bone chips or fragments which ordinarily are too bulky to pass through the relatively small perforations in the grinder plate, instead of being repeatedly swept in circular fashion around the forward face of the grinder plate and thus gradually comminuted by repeated encounter with the perforations and knife blades as previously described, will encounter the groove at the first pass of the knife and be forced into it by the pressure of the oncoming meat chunks, thus becoming removed from the influence of the knife blades so that they will not subsequently be sheared between the blade edges and the edges of the perforations and, hence, reduced to such small particle size that they will pass through the perforations in the grinder plate. With these larger bone fragments thus withdrawn from the grinding influence of the knife blades, a relatively large percentage of bone passage through the grinder plate will be effectively eliminated.

It is not contended that all of the bone content of any given batch of meat product will be eliminated by the grinder plate. It is, however, contended that substantially all of the larger bone fragments which ordinarily are incapable of passing immediately through the grinder plate perforations will be captured in the bone-collecting groove during the first pass of the knife and that also many small bone particles which fail immediately to pass through the perforations in the grinder plate will move onto the bone-collecting groove during their first encounter therewith.

In a modified form of the invention, the same principle of bone particle or fragment removal from the meat product obtains but the bone-collecting groove in the forward face of the perforated grinder plate, instead of assuming the form of an involute spiral, is linearly straight and approximately radial and communicates at its inner end with the central bone-collecting pocket in a generally tangential fashion.

The provision of a meat grinder such as has briefly been outlined above and possessing the stated advantages consitutes the principal object of the present invention.

The provision of a meat grinder which does not deviate appreciably from a conventional meat grinder in that it utilizes substantially the same grinder casing and rotary product-impelling worm and slicing knife assembly with only the grinder plate being of modified construction; one which may be manufactured as original equipment, or which, alternatively, may be applied to existing meat grinders by mere grinder plate substitution; one in which the perforated grinder plate may readily be removed from the grinder casing for emptying the bone content in its groove and central pocket and thereafter readily replaced; one in which the grinder plate may be constructed by simple and conventional drilling and milling operations; one which requires no special skill for its operation; and one which, otherwise, is well-adapted to perform the services required of it, are further desirable features which have been borne in mind in the production and development of the present invention.

Other advantages and objects of the invention, not at this time enumerated, will become readily apparent as the nature of the invention is better understood from the following detailed description.

The invention consists in the several novel features which are hereinafter described and are more particularly defined by the claims at the conclusion hereof.

In the accompanying single sheet of drawings forming a part of this specification, two illustrative embodiments of the invention are shown.

Figure 1:
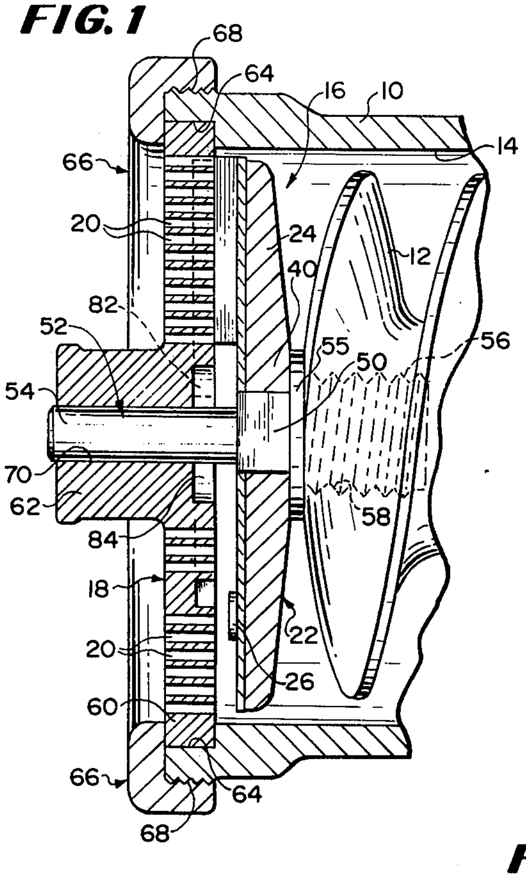
FIG. 1 is a fragmentary vertical longitudinal sectional view of a meat grinder having a bone-collecting perforated grinder plate embodying the preferred form of the present invention, such view being taken through the rear or discharge end of the grinder.

Referring now to the drawings in detail and in particular to FIG. 1, a meat grinder embodying one of the novel bone-collecting grinder plates of the present invention is fragmentarily illustrated, only the rear or discharge end of the grinder being shown for purposes of expediency. The grinder is conventional except for its grinder plate and involves in its general organization a horizontally extending tubular grinder casing 10 which embodies at its front or receiving end (not shown) the usual upstanding funnel-shaped hopper (also not shown) through which chunks of meat are fed downwardly to the interior of the casing 10 as a preliminary to horizontal pick-up and feed by a horizontally positioned rotatable worm 12. The latter is disposed coaxially in the grinder casing and serves when driven to conduct the meat chunks rearwardly through a cylindrical meat channel 14 first past a rotary cutter or knife assembly 16 and then against a stationary perforated grinder plate 18 having a multiplicity of transverse perforations 20 formed therein. As shown in the drawings, the perforations 20 in the grinder plate are comparatively small and of uniform diameter and extend throughout substantially the entire area of the plate. Such perforations, in combination with the cutter assembly 16, shear the meat chunks into small fragments which are forced rearwards through the perforations 20 and are then collected in a suitable receptacle (not shown) which may be positioned beneath the discharge or rear end of the meat grinder. It will be understood that the front end of the worm 12 is provided with the usual coaxial worm shaft and that the latter is adapted to be driven by an electric motor or other power source. Since only the rear end region of the meat grinder is illustrated in the drawings, the aforementioned hopper does not appear in said drawings, but for a full disclosure of a grinder casing having a hopper and worm shaft, reference may be had to U.S. Pat. No. 3,542,104, granted on Nov. 24, 1970, and entitled "MEAT GRINDER WITH PNEUMATICALLY BIASED RETAINING RING." It will be observed from such patent that in a conventional meat grinder, the worm shaft finds rotatable support in the front wall of its casing.

Figure 4:
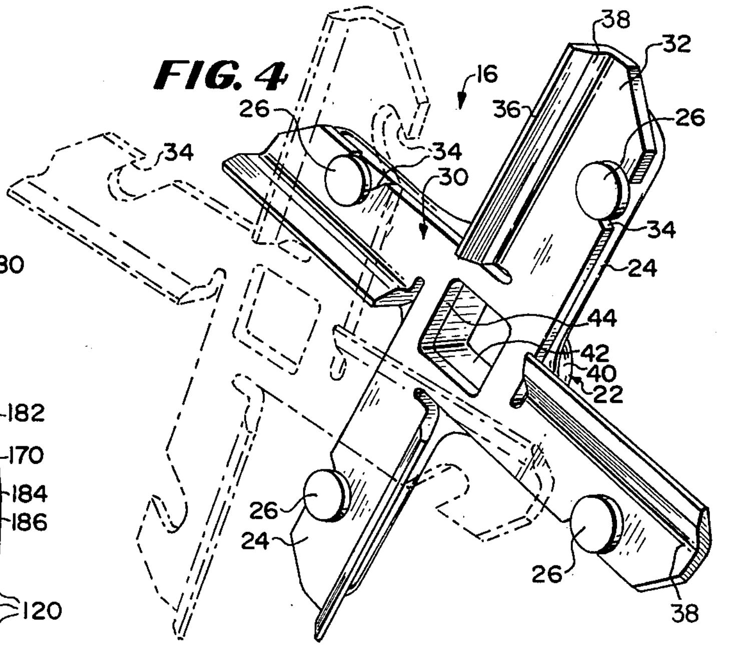
FIG. 4 is a rear perspective view of the cutter or knife assembly of the meat grinder of FIG. 1.

The rotary knife assembly 16 is shown in detail in FIG. 4 and it constitutes only one exemplary form of assembly which is capable of use in connection with the grinder casing 10, the worm 12, and the improved perforated grinder plate 18. No novelty is predicated upon the use of this particular knife assembly, but a full disclosure thereof is made in FIG. 4 in order to clarify the manner in which it appears in FIG. 1 and also the manner in which it cooperates with the perforated grinder plate 18 which, to a large extent, represents the novelty of the present invention. Briefly, the knife assembly 16 consists of two parts. The first part is in the form of a spider-like blade holder 22 having a series of four radial blade-backing arms 24 which are slightly quadrilaterally offset so that opposite pairs of arms are not quite in alignment. The arms 24 of the blade holder 22 embody headed reaction or locating lugs 26 which project outwardly and rearwardly from the rear faces of the arms 24. The second part of the rotary knife assembly 16 is in the form of a hardened steel knife blade member 30 which is shaped similarly to the holder 22 and comprises four similarly quadrilaterally offset radial arms 32 which overlie the arms 24 and are formed with notches 34. The latter normally are in interlocking relation with the headed lugs 26 and are formed in the trailing edges of the arms 32. The leading edge regions of the arms 32 are turned outwardly as indicated at 36 and afford tapered knife edges 38 which bear against the inner or forward planar face of the grinder plate 18 and cooperate with the perforations 22 for meat slicing or shearing purposes as is customary with a meat grinder of the particular character under consideration. Preferably, the knife blade member 30 of the assembly 16 is in the form of a stamping. The dotted line disclosure of the knife blade member 30 in FIG. 4 of the drawings illustrates the manner in which the two parts 22 and 30 of the knife assembly may be assembled upon each other. Except for the out-turned knife edge portions of the arms 32, the knife blade member 30 is planar and abuts directly against the rear face of the blade holder 22 of the assembly 16.

The blade holder 22 of said assembly 16 is formed with a central hub portion 40 through which there extends a square or other non-circular drive opening 42. Such opening registers with a similarly shaped opening 44 which is formed in the central portion of the knife blade member 30. The square openings 42 and 44 are designed for reception therein of a square drive section 50 (see FIG. 1) which is formed on the medial region of an axially extending one-piece pilot member 52. The latter embodies, in addition to the drive section 50, a rear pilot shaft 54, a cylindrical radially annular flange 55 immediately forwards of the drive section 50, and a relatively large diameter, externally threaded attachment plug 56. As shown in FIG. 1, such plug is threadedly received in an internally threaded socket 58 which is formed in the rear end of the worm 12. When the plug 56 is fully tightened in the socket 58, the forward face of the flange 55 abuts directly against the rear end face of worm 12. Because the pilot member 52 is in effect fixedly attached to the worm when the plug is screwed fully into the socket 56, and also because of the driving connection between the drive section 50 and the opening defining surfaces in the central portions of the blade holder 22 and the knife blade member 30, the assembly 16 rotates conjointly with the worm 12.

Figure 2:
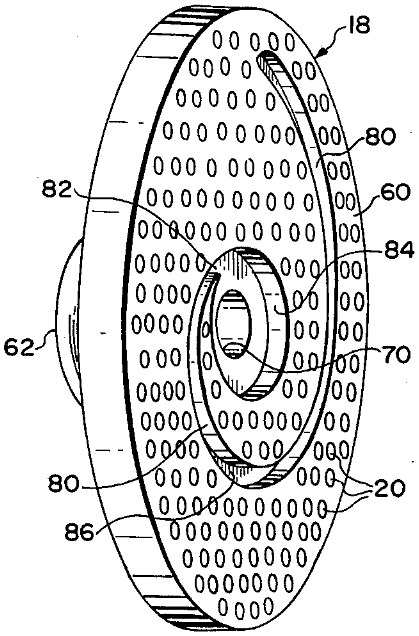
FIG. 2 is a front perspective view of the particular grinder plate of FIG. 1.

Referring now to FIGS. 1 and 2 of the drawings, the perforated grinder plate 18 includes a circular body portion 60 within which the aforementioned shearing perforations 20 are formed, and also includes a rearwardly extending cylindrical hub portion 62. The peripheral region or rim of the circular body portion 60 seats within an internal annular recess 64 in the rear end of the grinder casing 10 and is clamped in position therein by means of an internally threaded retainer ring 66 which is threadedly received over an external screw thread 68 on the rear end of the grinder casing 10. As shown in FIG. 1, the ring 66 is provided with a flange which extends radially inwards and engages the peripheral region of the grinder plate 18. The hub 62 is formed with a longitudinal or axial bore 70 in which the pilot shaft 54 of the pilot member 52 is journalled or rotatably mounted.

The general arrangement of parts thus far described is largely conventional, the novelty of the present invention residing in the provision in the forward face of the perforated grinder plate 18 of bone-collecting facilities which will now be described in detail and subsequently claimed.

According to the present invention and in order very materially to reduce the bone content that is to be found in the meat product issuing from the discharge end of the meat grinder, a relatively narrow involute or spiral groove 80 is formed in the inner or forward face of the grinder plate 18. This groove is materially wider than the perforations 20, commences at a point near the periphery of said grinder plate and progresses inwardly in involute fashion until its inner end communicates through an opening 82 with a comparatively large sized pocket 84 which is centrally formed in the forward face of the grinder plate and is disposed directly inwards of the hub 62. This pocket is in the form of a counterbore at the inner end of the axial bore 70 and serves with the groove 80 as a medium for collecting the various bone fragments which do not pass through the perforations in the grinder plate 18. By reason of the fact that the pilot shaft 54 at the rear end of the worm 12 extends through the center of the pocket 84 (see FIG. 1), the pocket is of annular configuration. The bottom wall 86 of the involute groove 80 is devoid of perforations and the depth of the groove is preferably equal to that of the bone-collecting pocket 84 with the result that the bottoms of the groove and pocket are coplanar. It has been found so far as the groove 80 is concerned that a single helix turn, commencing near the top of the circular grinder plate and terminating near the upper or top portion of the bone-collecting pocket 84, will afford good bone-collecting results, although a length somewhat greater or less than one full helix turn will suffice for the purposes intended. As shown in FIG. 2 of the drawings, the involute groove is one of about 360° and the opening 86 at its inner end communicates or intersects the outer peripheral portion of the annular pocket 84 in a tangential manner. Also as shown in FIG. 2, the bottom of the annular pocket 84 is devoid of perforations with the result that the pocket except for its open front is closed and, consequently, any and all bone particles and fragments which collect in the pocket do not pass through the plate to the outside of the grinder.

In the operation of the herein described meat grinder, it is the general function of the involute or spiral groove 80, in combination with the rotating knife edges 38, appreciably to reduce the number of bone fragments which pass through the perforations 20 in the grinder plate 18 along with the ground meat. The theory on which such a reduction in bone fragment passage is predicated upon the fact that in the absence of the involute or spiral groove 80, extremely small bone fragments or chips will pass readily through the perforations 20 under the influence of the pressure of the oncoming meat chunks. Larger bone fragments which ordinarily are unable to pass through the perforations 20 will be swept around the inner or forward face of the perforated cylinder plate 18 in a generally circular fashion and, in so moving, they will be abraded, sliced, sheared, ground or otherwise broken up into smaller particles which ultimately will be forced through the perforations 20. For example, a particularly large bone fragment may be caused to travel or orbit around the forward face of the grinder plate half a dozen or more times, but in so traveling, it will become comminuted due to its contact with the forward end edges of the various perforations which it encounters and due to the slicing action of the knife blades. Ultimately, there will be little left of such bone fragment and all of it will be forced through the perforations along with the comminuted meat. It should also be borne in mind that each time a perforation and a knife edge encounters a bone fragment in slicing relationship, a corresponding dulling of the knife edge will take place, even to the point of creating a chip in the blade edge.

According to the present invention which consists in the provision of the involute or spiral groove 80 in the inner or forward face of the grinder plate 18, a few very small bone fragments may be swept through the perforations 20, but these are ordinarily extremely minute and, hence, unnoticeable. However, the larger bone fragments which are unable to pass through the perforations 20 will be swept in circular fashion only as far as the points where they traverse or intersect the groove 80. At this time, the pressure of the oncoming meat product will force these larger bone fragments into the confines of the groove where they will become captured so that they can no longer sweep around the forward face of the grinder plate. Then, as the groove 80 tends to become filled, the rotary motion of the knife edges will exert a camming action on the mass of bone fragments within the groove, tending to move such mass lengthwise along the groove and ultimately into the counterbore-type bone fragment-collecting pocket 84. In this manner, both large and small bone fragments become captured within the involute spiral groove 80 and are ultimately deposited in the pocket 84. The fact that the groove 80 commences near the extreme upper periphery of the grinder plate 18 and extends downwardly with a large component of vertical motion allows the force of gravity to assist movement of the bone fragment mass longitudinally along the groove and toward the bone-collecting pocket 84. In the event any meat particles should collect in the groove 80 and the pocket 84, such meat particles will be forced from the groove and pocket as the larger bone fragments collect therein and the thus displaced meat particles will then flow through the grinder plate 18 via the perforations 20.

In actual practice, it has been found that when a grinder plate such as the plate 18 is used during a continuous run of meat chunks for grinding into commercially useable hamburger meat, the counterbore-type bone fragment-collecting pocket 84 as well as the groove 80 will become filled within about two hours and it is a comparatively simple matter to empty such pocket first by removing the retainer ring 66 by way of an unscrewing action, then emptying the pocket 84 and the groove, and finally replacing the various removed parts with only a few moments of idle grinder time. It has been estimated that, whereas with a conventional ungrooved grinder plate which passes all of the bone fragments in the meat chunks undergoing grinding, the use of the present grooved grinder plate 18 will materially reduce the bone content in the ground edible meat product.

Figure 3:
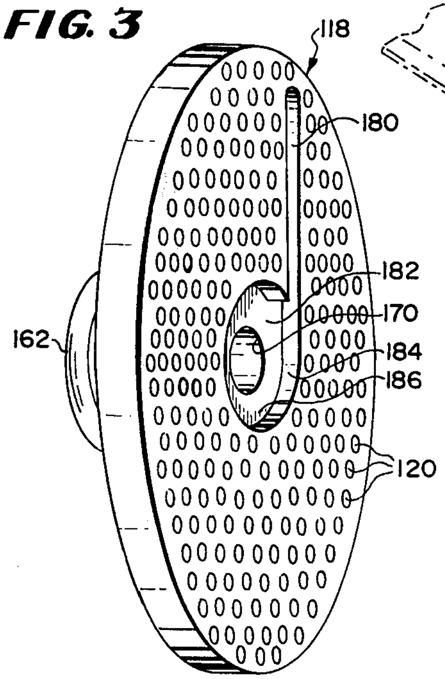
FIG. 3 is a perspective view similar to FIG. 2 but showing a modified form of bone-collecting perforated grinder plate.

In FIG. 3 of the drawings, a modified form of grinder plate 118 is disclosed, such plate being capable of substitution in the grinder casing 10 in place of the previously described grinder plate 18. Due to the similarity between the grinder plate 118 and the grinder plate 18, and in order to avoid needless repetition of description, similar reference numerals but of a higher order have been applied to the corresponding parts as between the disclosures of FIGS. 3 and 2 for example. The grinder plate 118, instead of being formed with an involute or spiral groove in its forward face, is provided with a linearly straight groove 180 which communicates in tangential fashion with the counterbore-type bone-collecting pocket 184. Otherwise, the two places 118 and 18 remain substantially the same. Preferably, but not necessarily, the groove 180 extends vertically so that the action of gravitational force will assist in impelling the large bone fragments downwardly into the pocket 184.

The invention is not to be limited to the exact arrangement of parts shown in the accompanying drawings or described in this specification as various changes in the details of construction may be resorted to without departing from the spirit or scope of the invention. For example, the particular two-part cutter assembly of FIGS. 1 and 4 need not necessarily be a four-blade cutter assembly and, as a matter of fact, a wide variety of other cutter assemblies as, for example, the cutter which is shown and described in aforementioned U.S. Pat. No. 3,542,104 may be substituted therefor if desired. Therefore, only insofar as the invention is particularly pointed out in the accompanying claims is the same to be limited.

Having thus described the invention what I claim as new and desire to secure by letters patent is:

1. A perforated grinder plate adapted for use in a meat grinder of the type that comprises a horizontally elongated tubular casing having one end thereof forming a meat inlet and its other end forming a ground meat outlet and defining a meat channel between the inlet and the outlet, a meat-impelling worm extending lengthwise of and mounted for rotation in the channel, provided at its rear end with a cylindrical pilot shaft, and effective upon rotation thereof to impell meat rearwardly through the channel from the inlet to the outlet, and a knife assembly mounted on the rear end region of the worm for rotation in unison with the worm and having a series of generally radially extending blades, said perforated meat grinder plate being adapted to extend vertically across said other end of the casing with its forward face in shearing relation with the blades of the knife assembly, embodying in its central portion an axial journal-forming bore for supporting rotatably said pilot shaft, and having formed in its forward face a large-sized counterbore which is disposed in coaxial relation with the bore and defines with the adjacent portion of the pilot shaft a substantially large annular bone-collecting pocket which except for its front end is closed in order that any bone particles which collect therein do not pass through the plate, said perforated grinder plate also having formed in its forward face a bone-receiving groove having a width greater than the diameter of the perforations, extending inwards from the peripheral region of the plate and having its inner end in tangential communication with the pocket.

2. A perforated grinder plate as set forth in claim 1 and wherein said bone-receiving groove is of involute design and the bottoms of the groove and pocket are coplanar and devoid of any perforations.

3. A perforated grinder plate as set forth in claim 2 and wherein said involute bone-receiving groove is in the form of a single helical turn of about 360° and has the outer end disposed adjacent to the top portion of the plate and its inner end in communication with the upper peripheral region of the pocket.

* * * * *